United States Patent
Byun

(10) Patent No.: US 11,263,148 B2
(45) Date of Patent: Mar. 1, 2022

(54) MAPPING HOST LOGICAL ADDRESS TO TARGET ADDRESS THAT IS SELECTED FROM COMBINATION OF FIRST MEMORY'S PHYSICAL ADDRESSES AND SECOND MEMORY'S VIRTUAL ADDRESSES

(71) Applicant: SK hynix Inc., Icheon-si (KR)

(72) Inventor: Eu Joon Byun, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 16/936,779

(22) Filed: Jul. 23, 2020

(65) Prior Publication Data
US 2021/0255961 A1 Aug. 19, 2021

(30) Foreign Application Priority Data
Feb. 13, 2020 (KR) .......................... 10-2020-0017719

(51) Int. Cl.
*G06F 12/1009* (2016.01)
(52) U.S. Cl.
CPC .. *G06F 12/1009* (2013.01); *G06F 2212/7201* (2013.01)
(58) Field of Classification Search
CPC .................... G06F 12/1009; G06F 2212/7201
See application file for complete search history.

(56) References Cited

U.S. PATENT DOCUMENTS

| | | | | |
|---|---|---|---|---|
| 2009/0063786 A1* | 3/2009 | Oh | ....................... | G06F 13/1684 711/148 |
| 2010/0312850 A1* | 12/2010 | Deshpande | ......... | G06F 12/1009 709/216 |
| 2019/0004869 A1* | 1/2019 | Kim | ....................... | G06F 9/5083 |
| 2019/0034306 A1 | 1/2019 | Wysocki et al. | | |

FOREIGN PATENT DOCUMENTS

KR 10-2006-0043201 A 5/2006

\* cited by examiner

*Primary Examiner* — Chie Yew
(74) *Attorney, Agent, or Firm* — Perkins Coie LLP

(57) ABSTRACT

A memory system is provided to include a first storage device including a first memory device and a first memory controller configured to receive, from a host external to the first storage device, a request including a logical address corresponding to the request; and a second storage device including a second memory device and a second memory controller coupled to receive a request from the first storage device and to control the second memory device, wherein the first memory controller is configured to select a target address among candidate addresses and map the logical address received from the host to the target address, and wherein the candidate addresses include first physical addresses corresponding to the first memory blocks and virtual addresses corresponding to the second memory blocks included in the second memory device.

20 Claims, 13 Drawing Sheets

MAPPING HOST LOGICAL ADDRESS TO TARGET ADDRESS THAT IS SELECTED FROM COMBINATION OF FIRST MEMORY'S PHYSICAL ADDRESSES AND SECOND MEMORY'S VIRTUAL ADDRESSES

CROSS-REFERENCE TO RELATED APPLICATION

This patent document claims priority to and benefits of the Korean patent application number 10-2020-0017719, filed on Feb. 13, 2020, which is incorporated herein by reference in its entirety.

TECHNICAL FIELD

Various embodiments of the disclosed technology relate to a memory system and a method of operating the memory system, and more particularly, to a memory system having a plurality of storage devices and a method of operating the memory system.

BACKGROUND

A memory system may include a memory device and a memory controller.

The memory controller may control the operation of the memory system in response to a request received from a host. The memory device may store data or output stored data under the control of the memory controller. For example, the memory device may be implemented as a volatile memory device in which stored data is lost when the supply of power is interrupted or as a nonvolatile memory device in which stored data is retained even when the supply of power is interrupted.

SUMMARY

Various embodiments of the disclosed technology are directed to a memory system and a method of operating the memory system, which can show performance matching the usage purpose of the memory system.

In one aspect, a memory system is provided to include a first storage device including a first memory controller and a first memory device; and a second storage device including a second memory controller and a second memory device, wherein the first memory controller selects any one of a plurality of candidate addresses as a target address, and maps a logical address received from a host, among a plurality of logical addresses included in an address mapping table, to the target address, and wherein the plurality of candidate addresses include first physical addresses corresponding to first memory blocks included in the first memory device and virtual addresses corresponding to second memory blocks included in the second memory device.

In another aspect, a memory system is provided to include a first storage device including a first memory device including first memory blocks for storing data and a first memory controller coupled to control the first memory device and configured to receive, from a host external to the first storage device, a request including a logical address corresponding to the request in connection with operating the first memory device, and a second storage device coupled to the first storage device and including a second memory device including second memory blocks for storing data and a second memory controller coupled to receive a request from the first storage device and to control the second memory device in response to the received request from the first storage device, wherein the first memory controller is configured to select a target address among candidate addresses, and map the logical address received from the host, to the target address, and wherein candidate addresses include first physical addresses corresponding to the first memory blocks included in the first memory device and virtual addresses corresponding to the second memory blocks included in the second memory device so that the first storage device uses the virtual addresses to carry out the request from the host to the first storage device by using second memory blocks in the second storage device.

In another aspect, a method of operating a memory system is provided. The method comprises: generating an address mapping table that includes a number of logical addresses corresponding to a storage capacity of first memory blocks included in a first memory device; generating a candidate address table that includes first physical addresses corresponding to the first memory blocks, as candidate addresses that are capable of being mapped to the logical addresses; generating a number of virtual addresses corresponding to a storage capacity of second memory blocks included in a second memory device; extending the candidate address table by adding the generated virtual addresses, as the candidate addresses, to the candidate address table; selecting a target address from among the candidate addresses included in the extended candidate address table; and setting an operation mode of the memory system to any one of a first operation mode and a second operation mode in response to a request from a host.

In another aspect, a method of operating a memory system is provided. The method may include generating an address mapping table that includes a number of logical addresses based on a storage capacity of first memory blocks included in a first memory device, generating a candidate address table that includes candidate addresses that are capable of being mapped to the logical addresses, the candidate addresses including first physical addresses corresponding to the first memory blocks, generating a number of virtual addresses based on a storage capacity of second memory blocks included in a second memory device separate from the first memory device, extending the candidate address table by adding the generated virtual addresses to the candidate address table as additional candidate addresses, selecting a target address to perform a request for data storage from a host among the candidate addresses and the additional candidate addresses that are included in the extended candidate address table, and in response to the request from the host, setting an operation mode of the memory system to a first operation mode for operating the first memory blocks of the first memory device without involving the second memory device or a second operation mode for operating both the first memory blocks of the first memory device and the second memory blocks of the second memory device.

DETAILED DESCRIPTION

Specific structural or functional descriptions in the embodiments of the disclosed technology introduced in this specification or application are exemplified to describe embodiments according to the concept of the disclosed technology. The embodiments of the disclosed technology may be practiced in various forms, and should not be construed as being limited to the embodiments described in the specification or application.

Figure 1:
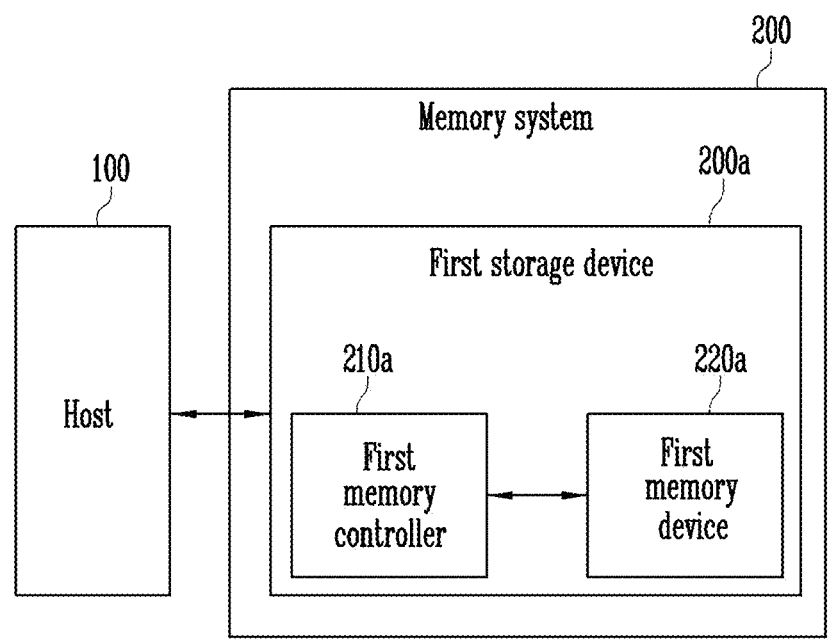
FIG. 1 is an example diagram illustrating a memory system.

FIG. 1 is an example diagram illustrating a memory system.

A memory system 200 may include a first storage device 200a. The first storage device 200a may include at least one first memory device 220a which stores data, and a first memory controller 210a which controls the first memory device 220a in response to a request from a host 100.

The host 100 may be a device or a system which stores data in the first storage device 200a or retrieves data from the first storage device 200a. For example, the host 100 may include at least one of a computer, a portable digital device, a tablet, a digital camera, a digital audio player, a television, a wireless communication device, or a cellular phone, but embodiments of the disclosed technology are not limited thereto.

The first memory controller 210a may control the overall operation of the first storage device 200a. The first memory controller 210a may perform various operations in response to requests received from the host 100. For example, the first memory controller 210a may perform a program operation, a read operation, an erase operation, etc. on the first memory device 220a.

The first memory device 220a may perform at least one of the program operation, the read operation and/or the erase operation under the control of the first memory controller 210a. The first memory device 220a may be implemented as a volatile memory device in which stored data is lost when the supply of power is interrupted or as a nonvolatile memory device in which stored data is retained even when the supply of power is interrupted.

Figure 2:
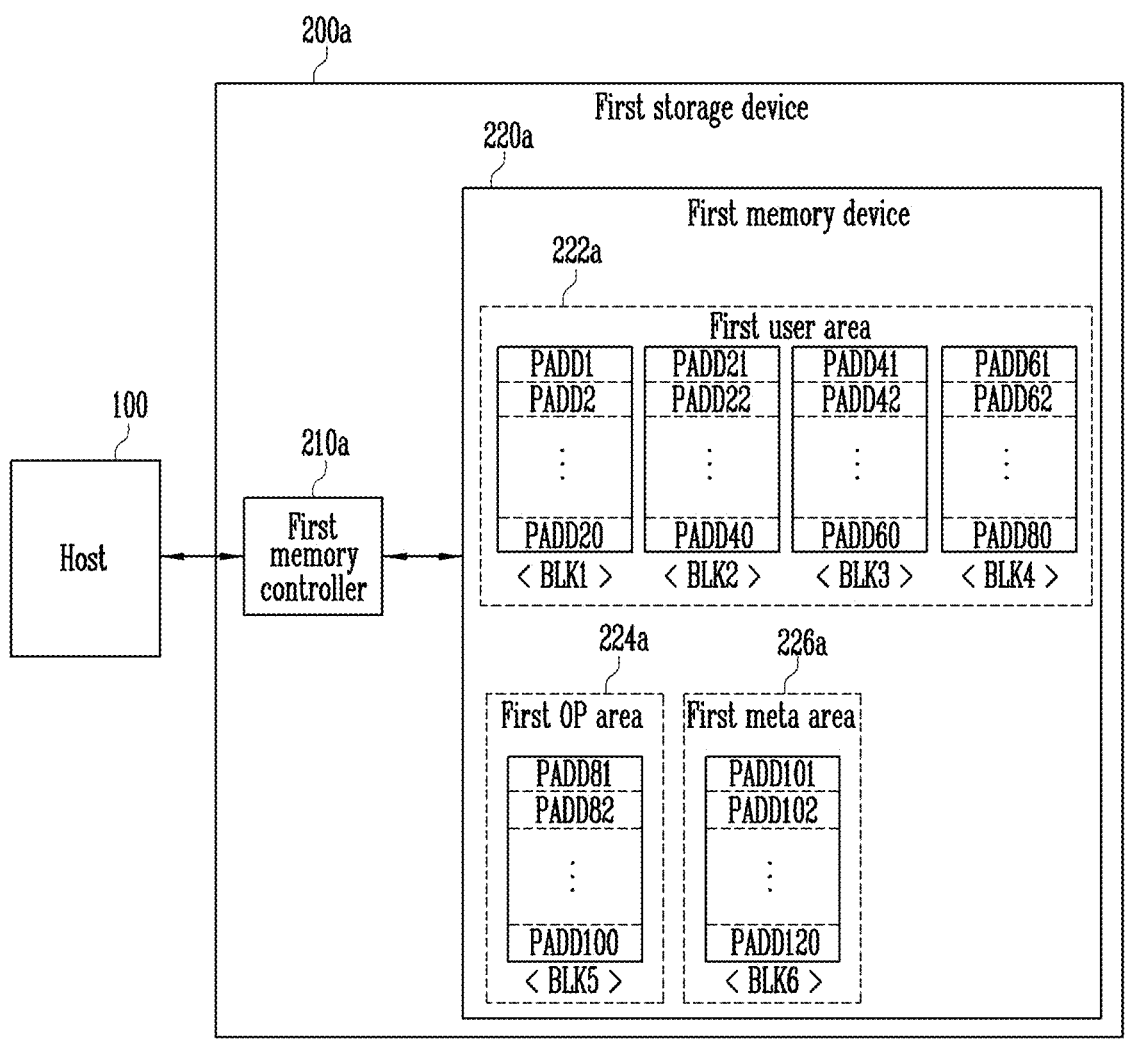
FIG. 2 is an example diagram illustrating a first memory device illustrated in FIG. 1.

FIG. 2 is an example diagram illustrating the first memory device illustrated in FIG. 1.

The first memory device 220a may include a plurality of storage areas. For example, the first memory device 220a may include at least one of a first user area 222a, a first over-provisioning area (first OP area) 224a, and a first meta area 226a.

Each of the first user area 222a, the first over-provisioning area 224a, and the first meta area 226a may include at least one memory block. Although an example in which four memory blocks BLK1 to BLK4 are included in the first user area 222a, one memory block BLK5 is included in the first over-provisioning area 224a, and one memory block BLK6 is included in the first meta area 226a is illustrated in FIG. 2, the number of memory blocks included in each of the storage areas 222a, 224a, and 226a is not limited thereto.

Data requested to be programmed by the host 100 may be stored in the first user area 222a.

The first over-provisioning area 224a may be used to improve the performance of the first storage device 200a. For example, pieces of valid data stored in the first user area 222a may be stored in the first over-provisioning area 224a during a garbage collection operation performed to secure free blocks. Each free block may be a memory block in which data is not stored.

Various types of information required by the first memory controller 210a to control the operation of the first storage device 200a may be stored in the first meta area 226a. For example, a first address mapping table including mapping information between logical addresses and physical addresses may be stored in the first meta area 226a. The first address mapping table stored in the first meta area 226a may be loaded and updated by the first memory controller 210a, and the updated first address mapping table may be stored in the first meta area 226a. Also, a first candidate address table including candidate addresses that can be mapped to logical addresses included in the first address mapping table may be stored in the first meta area 226a.

The storage capacity of the memory blocks BLK1 to BLK4 included in the first user area 222a may be provided to the host 100, and the host 100 may store and manage a plurality of logical addresses depending on the storage capacity of the memory blocks BLK1 to BLK4. For example, when the storage capacity of the memory blocks BLK1 to BLK4 is 1 MB and the host 100 manages data in units of 2 KB, the host 100 may manage 500 logical addresses for the first memory device 220a.

The storage capacity of the memory blocks BLK5 and BLK6 included in the first meta area 226a and the first over-provisioning area 224a may not be provided to the host 100.

Hereinafter, the storage capacity of the first storage device 200a may mean the storage capacity of the memory blocks BLK1 to BLK4 included in the first user area 222a, among the memory blocks BLK1 to BLK6 included in the first storage device 200a.

Figure 3:
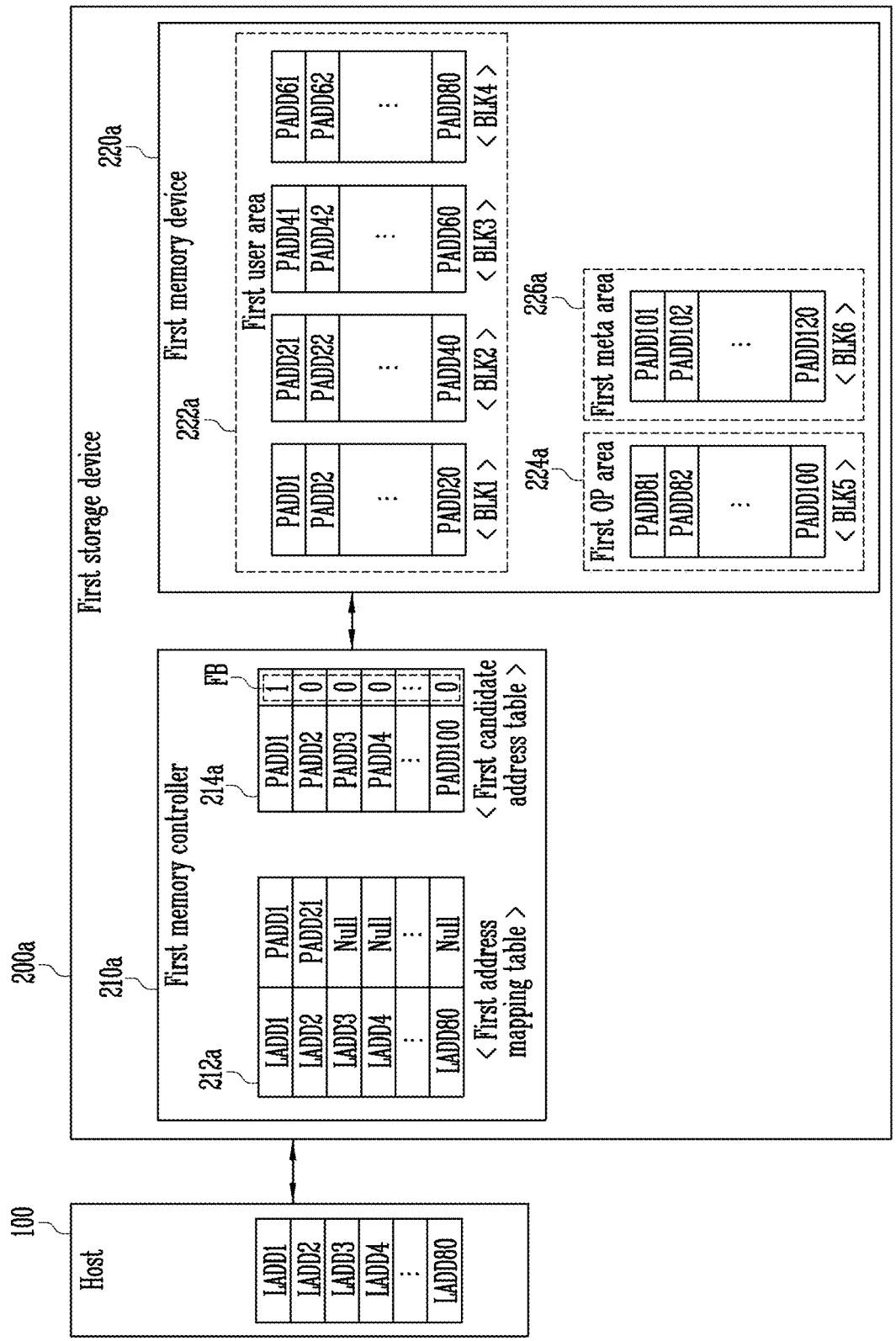
FIG. 3 is an example diagram explaining information managed by a host and a first storage device illustrated in FIG. 2.

FIG. 3 is an example diagram explaining information managed by the host and the first storage device illustrated in FIG. 2.

The host 100 may manage a number of first logical addresses LADD1 to LADD80 corresponding to the memory blocks for the storage capacity of the first storage device 200a, for example, the storage capacity of the memory blocks BLK1 to BLK4 included in the first user area 222a, among the memory blocks BLK1 to BLK6 included in the first storage device 200a. For example, during the initialization (e.g., formatting) of the first storage device 200a, the host 100 may receive information about the storage capacity of the first storage device 200a from the first storage device 200a, and may generate a number of first logical addresses LADD1 to LADD80 corresponding to the storage capacity of the first storage device 200a. The host 100 may transmit at least one of the first logical addresses LADD1 to LADD80 to the first storage device 200a so as to control the operation of the first storage device 200a.

The first memory controller 210a may manage a first address mapping table 212a and a first candidate address table 214a.

The first address mapping table 212a may include mapping information between the first logical addresses LADD1 to LADD80 managed by the host 100 and physical addresses corresponding to the first logical addresses LADD1 to LADD80. In an embodiment, the first address mapping table 212a may be generated during the initialization of the first storage device 200a. For example, during the initialization of the first storage device 200a, the first memory controller 210a may receive information about the first logical addresses LADD1 to LADD80 from the host 100, and may generate the first address mapping table 212a including all of the first logical addresses LADD1 to LADD80.

The first address mapping table 212a may be updated during a program operation or an erase operation. For example, when a logical address corresponding to a program request is received from the host 100, the first memory controller 210a may select, as a target address, any one of candidate addresses PADD1 to PADD80 included in the first candidate address table 214a, and may map the selected target address to the logical address received from the host 100. In FIG. 3, an example in which the logical address LADD1 is mapped to the physical address PADD1 and the logical address LADD2 is mapped to the physical address PADD21 is illustrated. In FIG. 3, "Null" indicates that a physical address is not mapped to the corresponding logical address.

The first candidate address table 214a may include physical addresses, corresponding to memory blocks included in the first memory device 220a, as candidate addresses. In the example as shown in FIG. 3, while the first memory device 220a includes memory blocks BLK1 to BLK6 having corresponding physical addresses PADD1 to PADD120, the physical addresses PADD1 to PADD80 corresponding to the first memory blocks BLK1 to BLK4 included in the first user area 222a and the physical addresses PADD81 to PADD100 corresponding to the first over-provisioning area 224a are included as candidate addresses in the first candidate address table 214a. Such configuration has been illustrated as an example only and other implementations of the disclosed technology are possible. In an embodiment, the first candidate address table 214a may be generated during the initialization of the first storage device 200a.

The first candidate address table 214a may include a flag bit FB indicating whether each of the candidate addresses PADD1 to PADD100 has been mapped to a predetermined logical address. For example, in the example illustrated in FIG. 3, the flag bit FB, '1', may indicate that the candidate address is mapped to a predetermined logical address, and the flag bit FB, '0', may indicate that the candidate address is not mapped to a predetermined logical address. During a program operation, the first memory controller 210a may select, as a target address, a candidate address that is not mapped to a predetermined logical address among the candidate addresses included in the first candidate address table 214a, and may map the selected target address to the logical address received from the host 100.

Since a nonvolatile memory device does not support overwriting, pieces of data stored before being updated are processed as invalid data, and mapping information between physical addresses at which the pieces of updated data are stored and logical addresses corresponding thereto are managed. Further, in the nonvolatile memory device, due to the non-overwriting characteristics, a garbage collection operation may be performed to allow pieces of valid data distributed to a plurality of memory blocks to migrate to one or more memory blocks so as to secure free blocks. In this case, the garbage collection operation may cause of the memory system 220 to deteriorate the reliability by increasing the number of program/erase cycles while inducing the update of mapping information.

Figure 4:
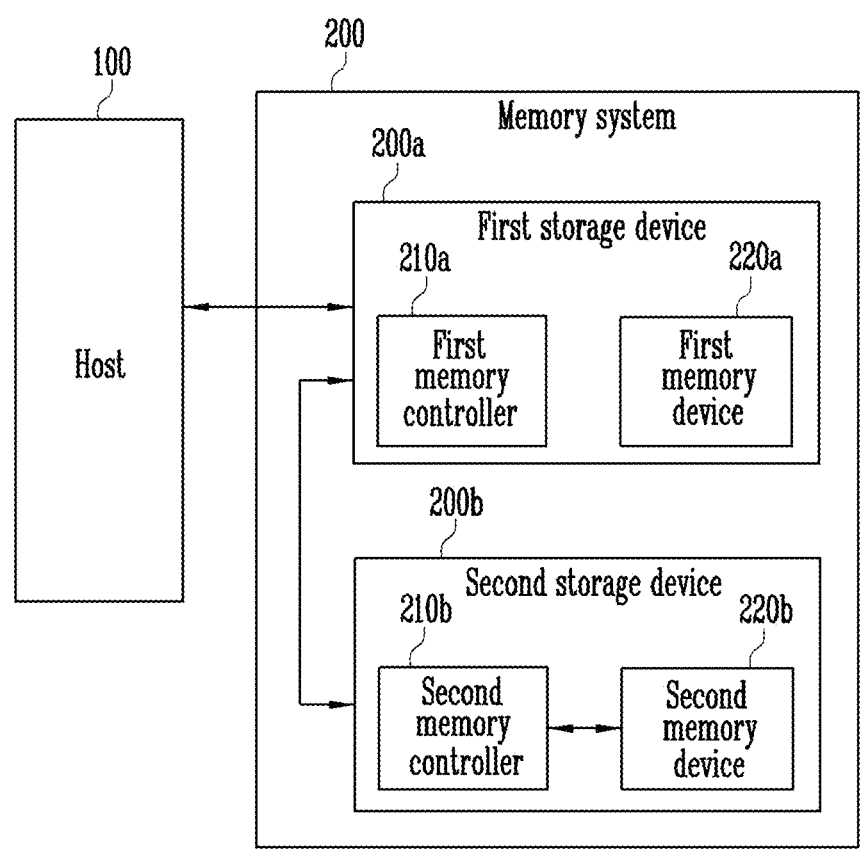
FIG. 4 is an example diagram illustrating a memory system.

FIG. 4 is an example diagram illustrating a memory system.

A memory system 200 may include a first storage device 200a and a second storage device 200b.

In an example illustrated in FIG. 4, the first storage device 200a may be a master device which controls the second storage device 200b, and the second storage device 200b may be a slave device which performs an operation under the control of the first storage device 200a.

The first storage device 200a may include at least one first memory device 220a which stores data, and a first memory controller 210a which controls the first memory device 220a in response to a request from a host 100.

The second storage device 200b may include at least one second memory device 220b which stores data and a second memory controller 210b which controls the second memory device 220b in response to a request from the first storage device 200a.

In an embodiment, the second storage device 200b may be coupled to the first storage device 200a during the use of the first storage device 200a. When the first storage device 200a is coupled to the second storage device 200b, the second storage device 200b may be initialized under the control of the host 100.

During the initialization of the second storage device 200b, the second memory controller 210b may provide information about the storage capacity of the second memory device 220b to the first memory controller 210a. The second memory device 220b may include a second user area, a second over-provisioning area, and a second meta area. Each of the second user area, the second over-provisioning area, and the second meta area may include at least one memory block. The storage capacity of the second memory device 220b may be the storage capacity of the memory blocks included in the second user area.

As described above with reference to FIG. 3, the first memory controller 210a may manage a first candidate address table 214a. When information about the storage capacity of the second memory device 220b is received from the second memory controller 210b, the first memory controller 210a may extend the first candidate address table 214a based on the information about the storage capacity of the second memory device 220b, which is received from the second memory controller 210b. For example, the first memory controller 210a may generate virtual addresses corresponding to the storage capacity of the second memory device 220b, and may extend the first candidate address table 214a by adding the generated virtual addresses to the first candidate address table 214a. Thus, the generated virtual addresses are also included as candidate addresses in the first candidate address table 214a in addition to the physical addresses corresponding to memory blocks included in the first memory device 220a. Examples related to this will be described later with reference to FIGS. 5 and 6.

The first memory controller 210a may provide information about the storage capacity of the second memory device 220b, received from the second memory controller 210b, to the host 100, and the host 100 may manage the storage capacity of the memory system 200 depending on the operation mode of the memory system 200. The operation mode of the memory system may include a first operation mode and a second operation mode, and may be set depending on a user's selection.

When the first operation mode is selected, the host 100 may manage the storage capacity of the memory system 200 as the storage capacity of the first memory device 220a. That is, in the first operation mode, the host 100 may manage a number of first logical addresses corresponding to the storage capacity of the first memory device 220a. An example related to this operation will be described later with reference to FIG. 5.

When the second operation mode is selected, the host 100 may manage the storage capacity of the memory system 200 as the sum of the storage capacity of the first memory device 220a and the storage capacity of the second memory device 220b. That is, in the second operation mode, the host 100 may manage a number of first logical addresses corresponding to the storage capacity of the first memory device 220a and a number of second logical addresses corresponding to the storage capacity of the second memory device 220b. An example related to this operation will be described later with reference to FIG. 6.

Meanwhile, in accordance with an embodiment, in a state in which the first storage device 200a and the second storage device 200b are coupled to each other, the initialization of the first storage device 200a and the second storage device 200b may also be simultaneously performed. In this case, the first memory controller 210a may provide the host 100 with information about the storage capacity of the first memory device 220a and information about the storage capacity of the second memory device 220b, received from the second memory controller 210b.

Figure 5:
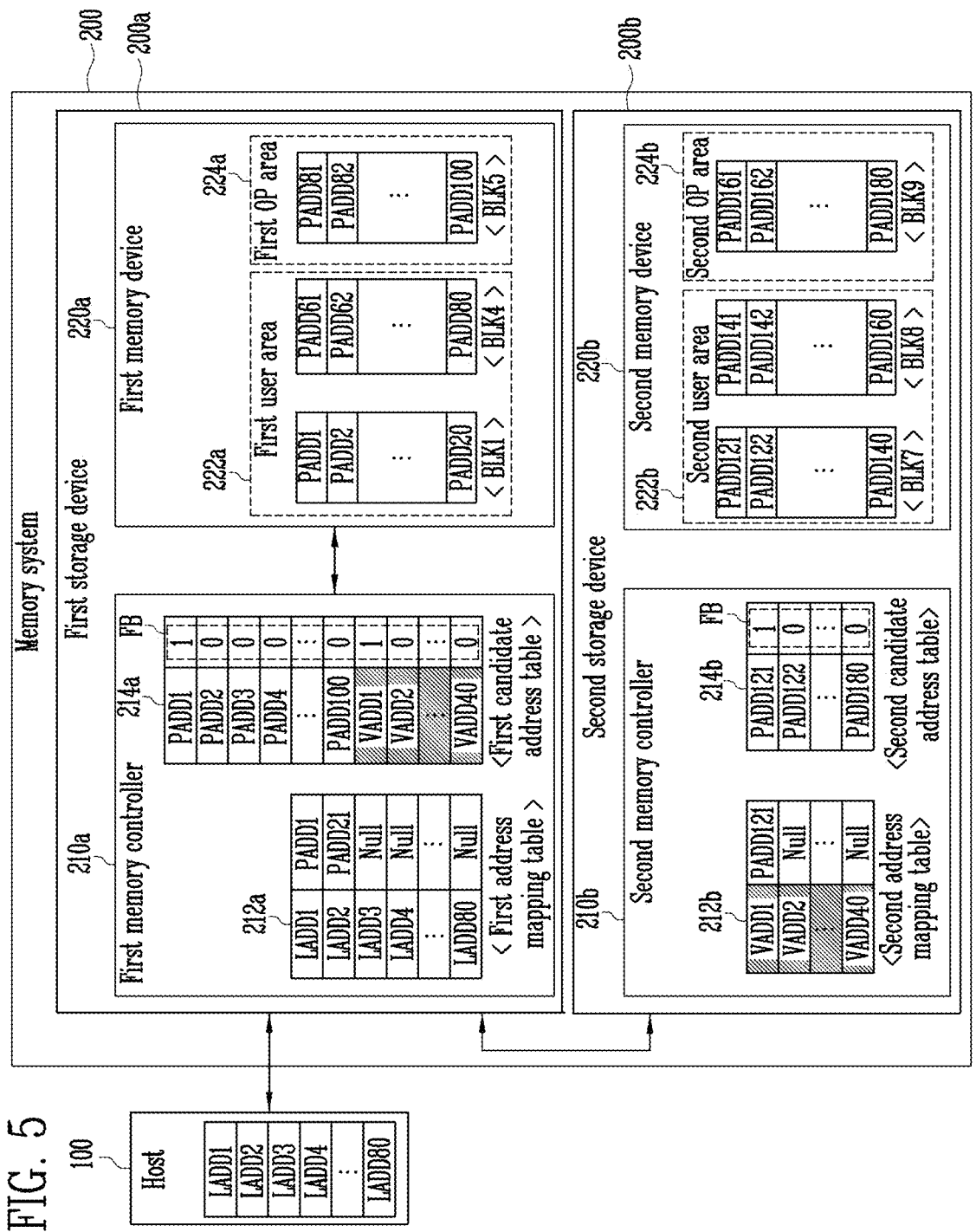
FIG. 5 is an example diagram explaining information managed by the host and the memory system in a first operation mode.

FIG. 5 is an example diagram explaining information managed by a host and a memory system in a first operation mode.

FIG. 5 illustrates an example in which a first user area 222a including four memory blocks BLK1 to BLK4 and a first over-provisioning (OP) area 224a including one memory block BLK5 are included in a first memory device 220a and in which a second user area 222b including two memory blocks BLK7 and BLK8 and a second over-provisioning area 224b including one memory block BLK9 are included in a second memory device 220b. In accordance with an embodiment, each of the first memory device 220a and the second memory device 220b may further include a meta area including at least one memory block.

As described above with reference to FIG. 3, the first memory controller 210a may manage a first address mapping table 212a and a first candidate address table 214a. For example, the first address mapping table 212a may include mapping information between first logical addresses LADD1 to LADD80 and physical addresses corresponding to the first logical addresses LADD1 to LADD80. For example, candidate addresses PADD1 to PADD100 corresponding to the memory blocks BLK1 to BLK4 included in the first user area 222a and the memory block BLK5 included in the first over-provisioning area 224a may be included in the first candidate address table 214a.

In the first operation mode, the first memory controller 210a may extend the first candidate address table 214a based on information about the storage capacity of the second memory device 220b. For example, the first memory controller 210a may generate virtual addresses VADD1 to VADD40 corresponding to the storage capacity of the second memory device 220b, and may extend the first candidate address table 214a by adding the generated virtual addresses VADD1 to VADD40 as candidate addresses to the first candidate address table 214a.

In the first operation mode, the second memory controller 210b may receive information about the virtual addresses VADD1 to VADD40 from the first memory controller 210a, and may generate a second address mapping table 212b including the virtual addresses VADD1 to VADD40. The second memory controller 210b may generate a second candidate address table 214a including physical addresses PADD121 to PADD180 corresponding to the memory blocks BLK7 and BLK8 included in the second user area 222b and the memory block BLK9 included in the second over-provisioning area 224b.

In the first operation mode, the host 100 may manage a number of logical addresses corresponding to the storage capacity of the first memory device 220a, while the first candidate address table 214a is extended to include virtual addresses VADD1 to VADD40 corresponding to the storage capacity of the second memory device 220b. In the first operation mode, the host 100 manages the storage capacity of the first memory device 220a of the memory system 200, which is less than an actual storage capacity corresponding to a sum of the storage capacities of the first memory device 220a and the second memory device 220b. Under this design, host 100 manages the storage capacity of the first memory device 220a. Therefore, compared to the host manages the actual storage capacity corresponding to the sum of the storage capacities of the first memory device 220a and the second memory device 220b, the frequency of the update of mapping information and occurrence of a garbage collection operation decreases, thereby improving the reliability and performance of the memory system 200.

Figure 6:
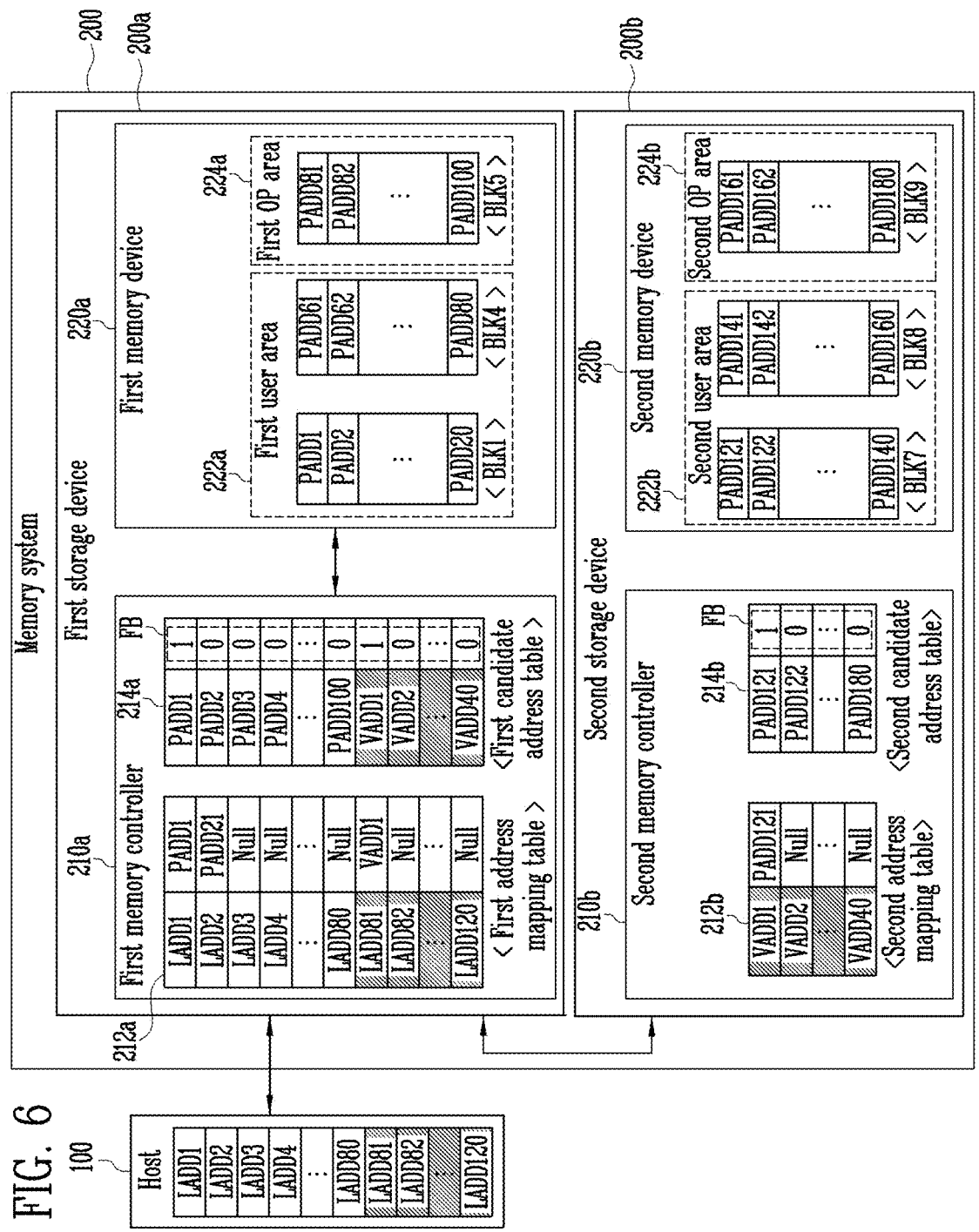
FIG. 6 is an example diagram explaining information managed by the host and the memory system in a second operation mode.

FIG. 6 is an example diagram explaining information managed by the host and the memory system in a second operation mode.

Similar to FIG. 5, FIG. 6 illustrates an example in which a first user area 222a including four memory blocks BLK1 to BLK4 and a first over-provisioning (OP) area 224a including one memory block BLK5 are included in a first memory device 220a and in which a second user area 222b including two memory blocks BLK7 and BLK8 and a second over-provisioning area 224b including one memory block BLK9 are included in a second memory device 220b. In accordance with an embodiment, each of the first memory device 220a and the second memory device 220b may further include a meta area including at least one memory block.

As described above with reference to FIG. 3, the first memory controller 210a may manage a first address mapping table 212a and a first candidate address table 214a. For example, the first address mapping table 212a may include mapping information between first logical addresses LADD1 to LADD80 and physical addresses corresponding to the first logical addresses LADD1 to LADD80. For example, candidate addresses PADD1 to PADD100 corresponding to the memory blocks BLK1 to BLK4 included in the first user area 222a and the memory block BLK5 included in the first over-provisioning area 224a may be included in the first candidate address table 214a.

When the second operation mode is selected, the host 100 may generate a number of second logical addresses LADD81 to LADD120 corresponding to the storage capacity of the second memory device 220b based on the information about the storage capacity of the second memory device 220b. The host 100 may control the memory system 200 based on the first logical addresses LADD1 to LADD80 and the second logical addresses LADD81 to LADD120.

When the second operation mode is selected, the first memory controller 210a may receive information about the second logical addresses LADD81 to LADD120 from the host 100, and may extend the first address mapping table 212a so that the first address mapping table 212a includes the second logical addresses LADD81 to LADD120.

When the second operation mode is selected, the first memory controller 210a may extend the first candidate address table 214a based on information about the storage capacity of the second memory device 220b. For example, the first memory controller 210a may generate a number of virtual addresses VADD1 to VADD40 corresponding to the storage capacity of the second memory device 220b, and may extend the first candidate address table 214a by adding the generated virtual addresses VADD1~VADD40, as candidate addresses, to the first candidate address table 214a.

When the second operation mode is selected, the second memory controller 210b may receive information about the virtual addresses VADD1 to VADD40 from the first memory controller 210a, and may generate a second address mapping table 212b including the virtual addresses VADD1 to VADD40. The second memory controller 210b may generate a second candidate address table 214a including physical addresses PADD121 to PADD180 corresponding to the memory blocks BLK7 and BLK8 included in the second user area 222b and the memory block BLK9 included in the second over-provisioning area 224b.

In the second operation mode, the host 100 may manage a number of logical addresses corresponding to the sum of the storage capacity of the first memory device 220a and the storage capacity of the second memory device 220b. Thus, in the second operation mode, the host 100 may manage the storage capacity of the memory system 200 as an actual storage capacity. Therefore, in comparison with the embodiment described above with reference to FIG. 5, more storage capacity of the memory system 200 can be used.

Figure 7:
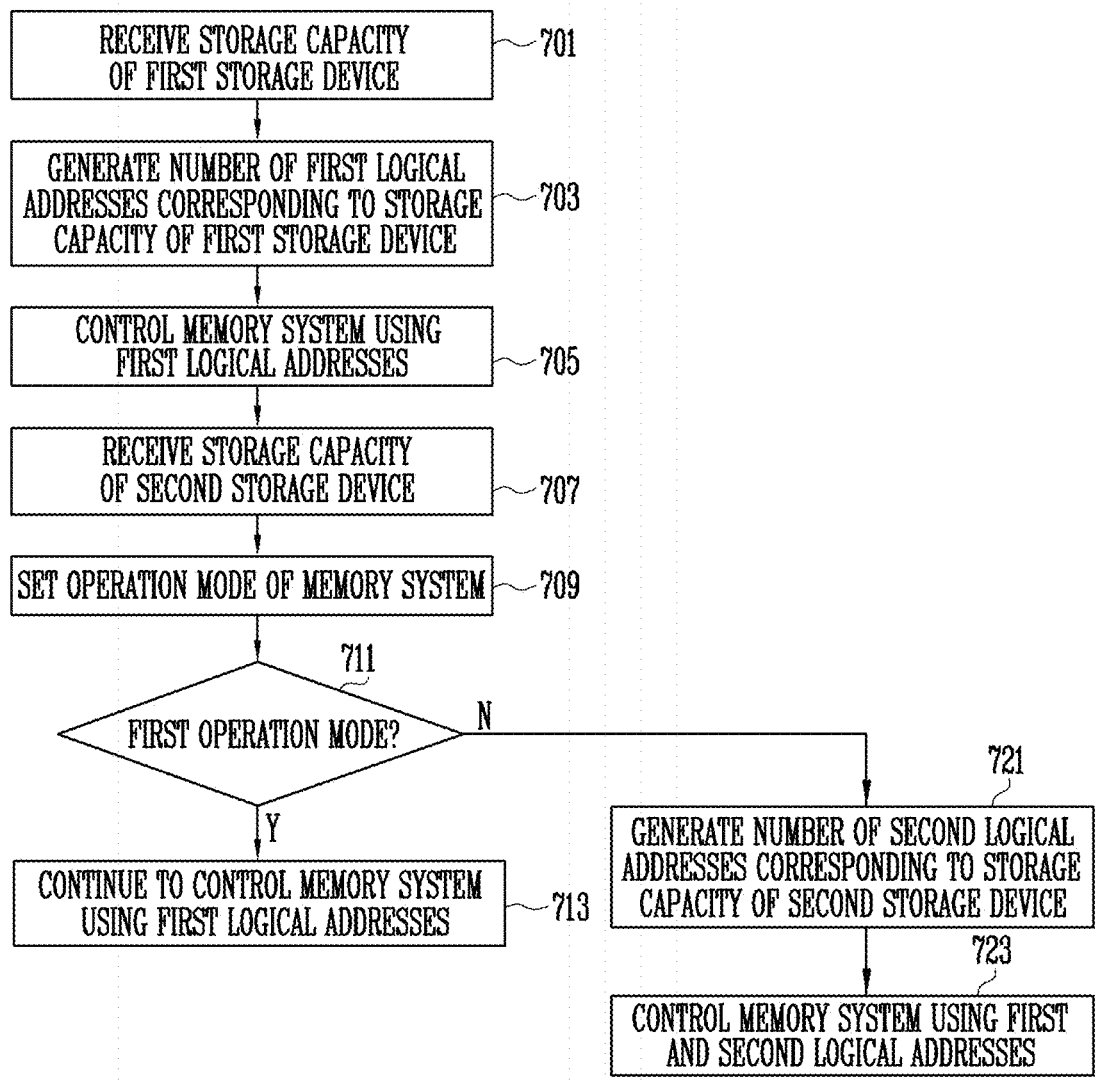
FIG. 7 is a flowchart illustrating a method of operating the host illustrated in FIGS. 1 to 6.

FIG. 7 is a flowchart illustrating a method of operating the host illustrated in FIGS. 1 to 6 based on some implementations of the disclosed technology.

At step 701, the host 100 may receive information about the storage capacity of the first storage device 200a from the first storage device 200a. Step 701 may be performed, for example, during initialization of the first storage device 200a. For example, the storage capacity of the first storage device 200a may be the storage capacity of memory blocks included in the first user area, among a plurality of memory blocks included in the first storage device 200a.

At step 703, the host 100 may generate first logical addresses indicating a number of logical addresses corresponding to the storage capacity of the first storage device 200a.

At step 705, the host 100 may control the memory system 200 using the first logical addresses.

At step 707, the host 100 may receive information about the storage capacity of the second storage device 200b from the first storage device 200a. Step 707 may be performed, for example, during initialization of the second storage device 200b. For example, the storage capacity of the second storage device 200b may be the storage capacity of memory blocks included in the second user area, among a plurality of memory blocks included in the second storage device 200b.

At step 709, the host 100 may set the operation mode of the memory system 200. The setting of the operation mode may be performed, for example, according to the input by a user who selects the operation mode.

At step 711, the host 100 may determine whether the operation mode of the memory system 200 has been set to a first operation mode.

When a result of the determination at step 711 indicates that the operation mode of the memory system 200 has been set to the first operation mode (i.e., in case of 'Y' at the step 711), step 713 may be performed.

At step 713, the host 100 may continue to control the memory system 200 using the first logical addresses.

When a result of the determination at step 711 indicates that the operation mode of the memory system 200 has been set to a second operation mode instead of the first operation mode (i.e., in case of 'N' at the step 711), step 721 may be performed.

At step 721, the host 100 may generate second logical addresses indicating a number of logical addresses corresponding to the storage capacity of the second storage device 200b.

At step 723, the host 100 may control the memory system 200 using the first logical addresses and the second logical addresses.

Figure 8:
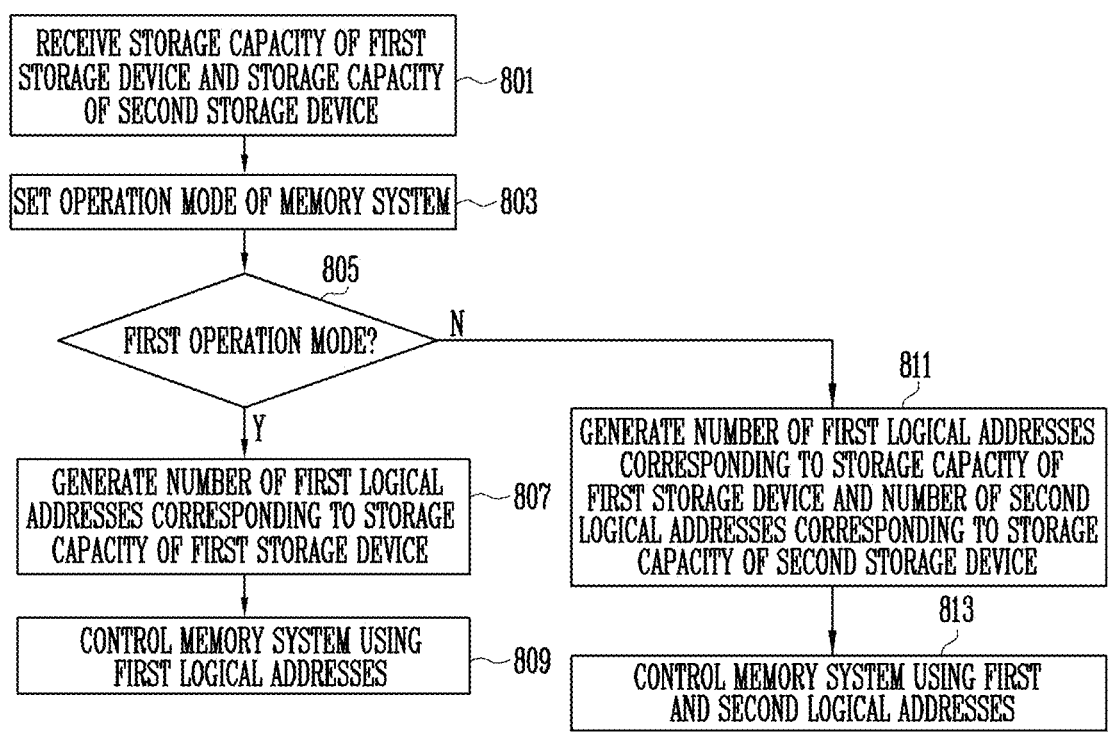
FIG. 8 is a flowchart illustrating a method of operating the host illustrated in FIGS. 1 to 6.

FIG. 8 is a flowchart illustrating a method of operating the host illustrated in FIGS. 1 to 6 based on some implementations of the disclosed technology. The sequence of the operations in the implementation as shown in FIG. 8 is different from that in the implementation as shown in FIG. 7.

At step 801, the host 100 may receive information about the storage capacity of the first storage device 200a and the storage capacity of the second storage device 200b. Step 801 may be performed, for example, when the first storage device 200a and the second storage device 200b are simultaneously initialized. For example, the storage capacity of the first storage device 200a may be the storage capacity of memory blocks included in the first user area, among a plurality of memory blocks included in the first storage device 200a. For example, the storage capacity of the second storage device 200b may be the storage capacity of memory blocks included in the second user area, among a plurality of memory blocks included in the second storage device 200b.

At step 803, the host 100 may set the operation mode of the memory system 200. In some implementations, the host 100 may receive an input from a user to set the operation mode of the memory system. In this case, the user selects the operation mode.

At step 805, the host 100 may determine whether the operation mode of the memory system 200 has been set to a first operation mode.

When a result of the determination at step 805 indicates that the operation mode of the memory system 200 has been set to the first operation mode (i.e., in case of 'Y' at the step 805), step 807 may be performed.

At step 807, the host 100 may generate first logical addresses indicating a number of logical addresses corresponding to the storage capacity of the first storage device 200a.

At step 809, the host 100 may control the memory system 200 using the first logical addresses.

When a result of the determination at step 805 indicates that the operation mode of the memory system 200 has been set to a second operation mode instead of the first operation mode (i.e., in case of 'N' at the step 805), step 811 may be performed.

At step 811, the host 100 may generate first logical addresses indicating a number of logical addresses corresponding to the storage capacity of the first storage device 200a and second logical addresses indicating a number of logical addresses corresponding to the storage capacity of the second storage device 200b.

At step 813, the host 100 may control the memory system 200 using the first logical addresses and the second logical addresses.

Figure 9:
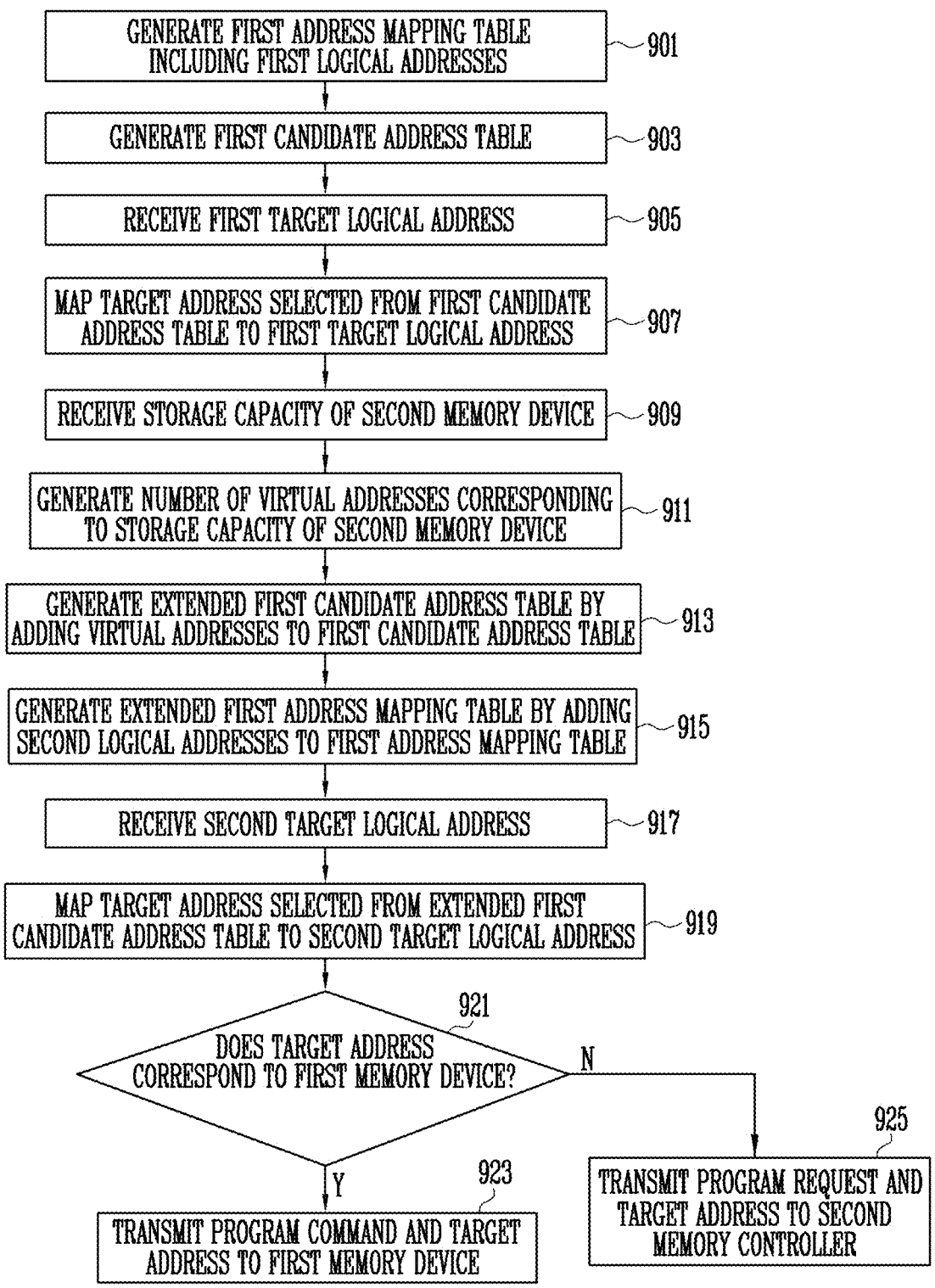
FIG. 9 is a flowchart illustrating a method of operating a first memory controller illustrated in FIGS. 1 to 6.

FIG. 9 is a flowchart illustrating a method of operating the first memory controller illustrated in FIGS. 1 to 6 based on some implementations of the disclosed technology.

The operations 901 to 925 are included in the flowchart shown in FIG. 9. In an embodiment, at least one of steps illustrated in FIG. 9 may be omitted. For example, when the operation mode of the memory system 200 is selected as a first operation mode, step 915 may be omitted.

At step 901, the first memory controller 210a may generate a first address mapping table including first logical addresses. For example, step 901 may be performed based on information about first logical addresses received from the host 100 during the initialization of the first storage device 200a.

At step 903, the first memory controller may generate a first candidate address table. In the first candidate address table, candidate addresses that can be mapped to the first logical addresses may be included. For example, the candidate addresses may be physical addresses corresponding to memory blocks included in the first user area and the first over-provisioning area, among memory blocks included in the first memory device 220a.

At step 905, the first memory controller 210a may receive a first target logical address. For example, the first memory controller 210a may receive the first target logical address corresponding to a program request from the host 100.

At step 907, the first memory controller 210a may select, as a target address, any one candidate address from among candidate addresses included in the first candidate address table, and may map the selected target address to the first target logical address.

At step 909, the first memory controller 210a may receive information about the storage capacity of the second memory device 220b. Step 909 may be performed, for example, during initialization of the second memory device 220b. For example, the storage capacity of the second memory device 220b may be the storage capacity of memory blocks included in the second user area, among a plurality of memory blocks included in the second memory device 220b.

At step 911, the first memory controller 210a may generate a number of virtual addresses corresponding to the storage capacity of the second memory device 220b.

At step 913, the first memory controller 210a may generate an extended first candidate address table by adding the virtual addresses, as candidate addresses, to the first candidate address table.

At step 915, the first memory controller 210a may generate the extended first address mapping table by adding second logical addresses to the first address mapping table. For example, when the operation mode of the memory system 200 is selected as a second operation mode, step 915 may be performed. The first memory controller 210a may receive information about the second logical addresses from the host 100, and may add the second logical addresses to the first address mapping table based on the received information about the second logical addresses.

At step 917, the first memory controller 210a may receive a second target logical address. For example, the first memory controller 210a may receive the second target logical address corresponding to a program request from the host 100. When the first operation mode is selected, the second target logical address received from the host 100 may be any one of the first logical addresses. When the second operation mode is selected, the second target logical address received from the host 100 may be any one of the first logical addresses or any one of the second logical addresses.

At step 919, the first memory controller 210a may select, as a target address, any one candidate address from among candidate addresses included in the extended first candidate address table, and may map the selected target address to the second target logical address.

In an embodiment, the first memory controller 210a may select the target address from among the candidate addresses included in the extended first candidate address table in consideration of the ratio of free blocks to the memory blocks included in the first memory device 220a. Here, the memory blocks included in the first memory device 220a may be memory blocks included in the first user area, or may be memory blocks included in the first user area and the first over-provisioning area.

For example, when the ratio of free blocks to the memory blocks included in the first memory device 220a is equal to or greater than a first threshold value, the first memory controller 210a may select the target address from among physical addresses corresponding to the first memory device 220a in the candidate addresses included in the extended first candidate address table. The first threshold value may be arbitrarily or experimentally determined.

For example, when the ratio of free blocks to the memory blocks included in the first memory device 220a is less than the first threshold value, the first memory controller 210a may select the target address from among virtual addresses corresponding to the second memory device 220b in the candidate addresses included in the extended first candidate address table.

In an embodiment, the first memory controller 210a may select the target address from among the candidate addresses included in the extended first candidate address table in consideration of the ratio of valid data to pieces of data stored in the memory blocks included in the first memory device 220a. Here, the memory blocks included in the first memory device 220a may be memory blocks included in the first user area, or may be memory blocks included in the first user area and the first over-provisioning area.

For example, when the ratio of valid data to the pieces of data stored in the memory blocks included in the first memory device 220a is less than a second threshold value, the first memory controller 210a may select the target address from among physical addresses corresponding to the first memory device 220a in the candidate addresses included in the extended first candidate address table. The second threshold value may be arbitrarily or experimentally determined.

For example, when the ratio of valid data to the pieces of data stored in the memory blocks included in the first memory device 220a is equal to or greater than the second threshold value, the first memory controller 210a may select the target address from among virtual addresses corresponding to the second memory device 220b in the candidate addresses included in the extended first candidate address table.

At step 921, the first memory controller 210a may determine whether the target address selected in accordance with the second target logical address corresponds to the first memory device 220a. For example, when the selected target address is a physical address, the first memory controller 210a may determine that the selected target address corresponds to the first memory device 220a, whereas when the selected target address is a virtual address, the first memory controller 210a may determine that the selected target address corresponds to the second memory device 220b.

When a result of the determination at step 921 indicates that the selected target address corresponds to the first memory device 220a (i.e., in case of 'Y' at the step 921), step 923 may be performed. At step 923, the first memory controller 210a may transmit a program command and the target address to the first memory device 220a.

When a result of the determination at step 921 indicates that the selected target address does not correspond to the first memory device 220a (i.e., in case of 'N' at the step 921), that is, when the selected target address corresponds to the second memory device 220b, step 925 may be performed. At step 925, the first memory controller 210a may transmit a program request and the target address to the second memory controller 210b.

Figure 10:
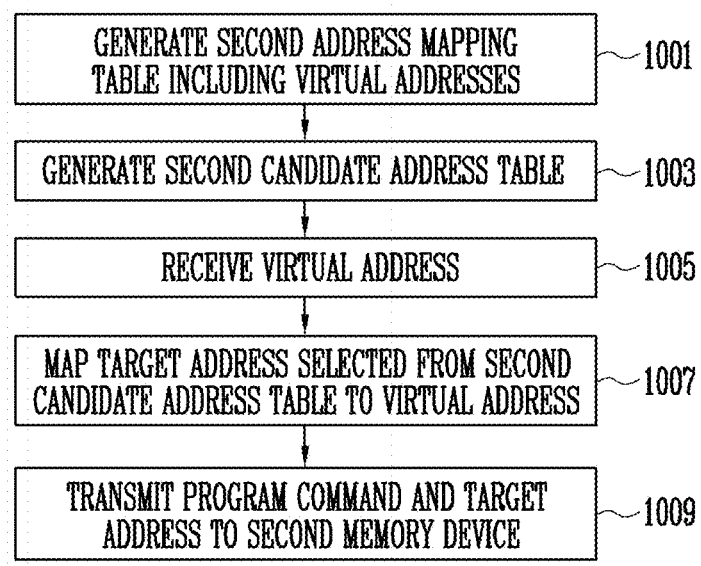
FIG. 10 is a flowchart illustrating a method of operating a second memory controller illustrated in FIGS. 4 to 6.

FIG. 10 is a flowchart illustrating a method of operating the second memory controller illustrated in FIGS. 4 to 6 based on some implementations of the disclosed technology.

At step 1001, the second memory controller 210b may generate a second address mapping table including virtual addresses. For example, step 1001 may be performed based on information about virtual addresses received from the first memory controller 210a during the initialization of the second storage device 200b.

At step 1003, the second memory controller may generate a second candidate address table. In the second candidate address table, candidate addresses that can be mapped to the virtual addresses may be included. For example, the candidate addresses may be physical addresses corresponding to memory blocks included in the second user area and the second over-provisioning area, among memory blocks included in the second memory device 220b.

At step 1005, the second memory controller 210b may receive a virtual address. For example, the second memory controller 210b may receive the virtual address together with a program request from the first memory controller 210a.

At step 1007, the second memory controller 210b may select, as a target address, any one candidate address from among candidate addresses included in the second candidate address table, and may map the selected target address to the virtual address.

At step 1009, the second memory controller 210b may transmit a program command and the target address to the second memory device 220b.

Figure 11:
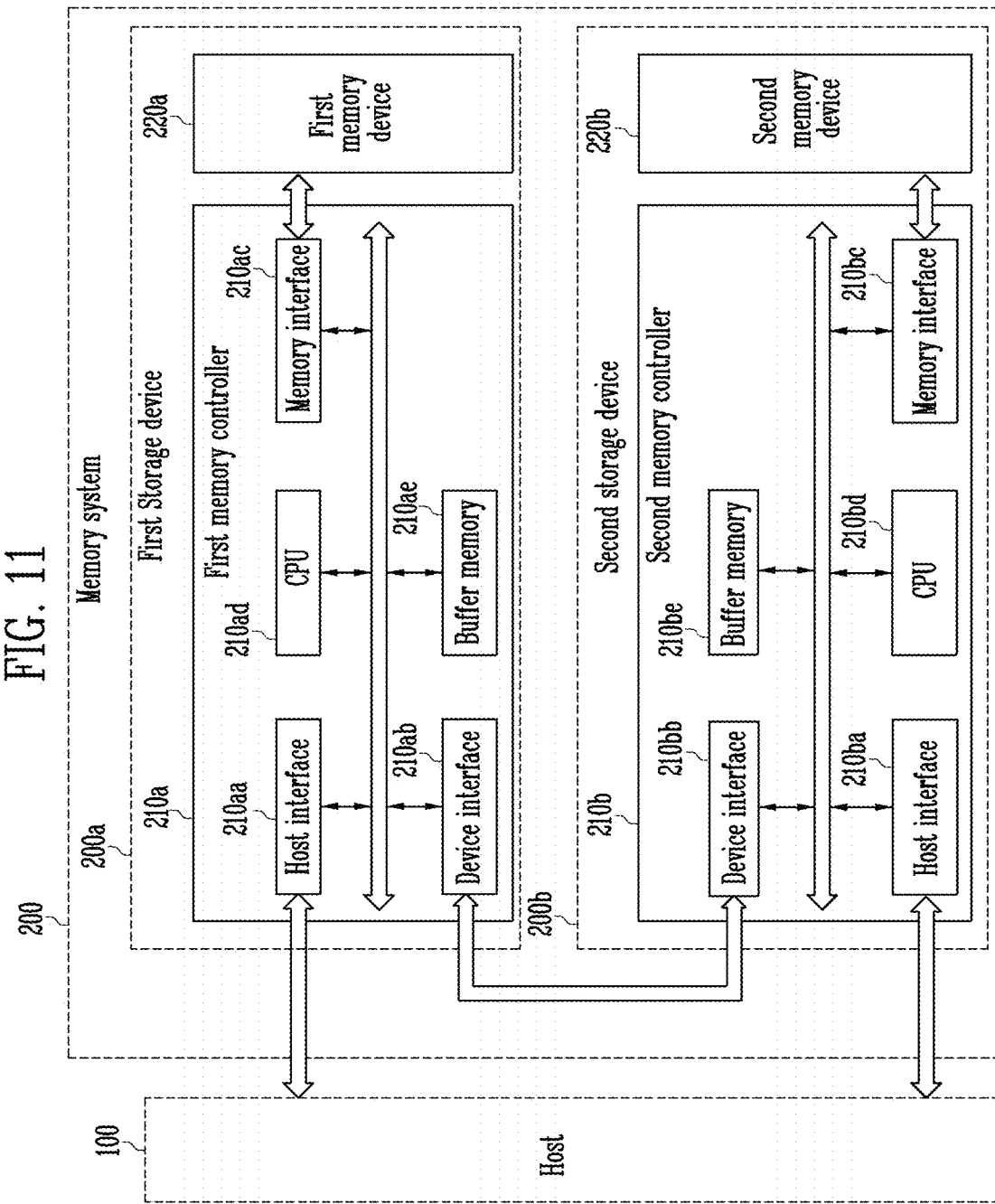
FIG. 11 is an example diagram illustrating the first memory controller and the second memory controller illustrated in FIG. 4.

FIG. 11 is an example diagram illustrating the first memory controller and the second memory controller illustrated in FIG. 4.

The first memory controller 210a may include a host interface 210aa, a device interface 210ab, a memory interface 210ac, a central processing unit (CPU) 210ad, and a buffer memory 210ae. The host interface 210aa, the device interface 210ab, the memory interface 210ac, and the buffer memory 210ae may be controlled by the CPU 210ad.

The host interface 210aa may communicate with the host 100 using various interface protocols. For example, the host interface 210a may communicate with the host 100 using at least one of interface protocols, such as Non-Volatile Memory express (NVMe), Peripheral Component Interconnect-Express (PCI-E), Advanced Technology Attachment (ATA), Serial ATA (SATA), Parallel ATA (PATA), Universal Serial Bus (USB), Multi-Media Card (MMC), Enhanced Small Disk Interface (ESDI), Integrated Drive Electronics (IDE), Mobile Industry Processor Interface (MIPI), Universal Flash Storage (UFS), Small Computer Small Interface (SCSI), and serial attached SCSI (SAS), but embodiments of the disclosed technology are not limited thereto.

When the first storage device 200a functions as a master device of the second storage device 200b, the device interface 210ab may communicate with a device interface 210bb of the second storage device 200b using various interface protocols.

When the first storage device 200a and the second storage device 200b are independently operated, the device interface 210ab may be deactivated.

The memory interface 210ac may communicate with the first memory device 220a using various interface protocols.

The CPU 210ad may perform various types of operations so as to control the first memory device 220a. The CPU 210ad may generate a first address mapping table and a first candidate address table. In an embodiment, the first address mapping table and the first candidate address table may be generated during the initialization of the first memory device 220a.

When the second storage device 200b is coupled to the first storage device 200a and the first storage device 200a functions as a master device of the second storage device 200b, the CPU 210ad may provide the host 100 with information about the storage capacity of the second memory device 220b, received from the second storage device 200b. Further, the CPU 210ad may generate virtual addresses corresponding to the storage capacity of the second memory device 220b based on the information about the storage capacity of the second memory device 220b, and may generate an extended first candidate address table by adding the generated virtual addresses to the first candidate address table.

During a program operation, the CPU 210ad may receive a target logical address from the host 100, and may select a target address corresponding to the received target logical address from the extended first candidate address table. The CPU 210ad may map the selected target address to the target logical address. When the selected target address is a physical address corresponding to the first memory device 220a, the CPU 210ad may transmit a program command and the target address to the first memory device 220a. When the selected target address is a virtual address corresponding to the second memory device 220b, the CPU 210ad may transmit a program request and the target address to the second memory controller 210b.

The buffer memory 210ae may temporarily store data while the first memory controller 210a controls the first memory device 220a. The buffer memory 210ae may be used as a storage which stores various types of information required for the operation of the first memory controller 210a. The buffer memory 210ae may store a plurality of tables. For example, the buffer memory 210ae may store at least one of the first address mapping table and the first candidate address table.

The first memory controller may include a host interface 210ba, a device interface 210bb, a memory interface 210bc, a central processing unit (CPU) 210bd, and a buffer memory 210be. The host interface 210ba, the device interface 210bb, the memory interface 210bc, and the buffer memory 210be may be controlled by the CPU 210bd.

The host interface 210ba may communicate with the host 100 using various interface protocols. For example, the host interface 210ba may communicate with the host 100 using at least one of interface protocols, such as Non-Volatile Memory express (NVMe), Peripheral Component Interconnect-Express (PCI-E), Advanced Technology Attachment (ATA), Serial ATA (SATA), Parallel ATA (PATA), Universal Serial Bus (USB), Multi-Media Card (MMC), Enhanced Small Disk Interface (ESDI), Integrated Drive Electronics (IDE), Mobile Industry Processor Interface (MIPI), Universal Flash Storage (UFS), Small Computer Small Interface (SCSI), and serial attached SCSI (SAS), but embodiments of the disclosed technology are not limited thereto.

When the second storage device 200b functions as a slave device of the first storage device 200a, the host interface 210ba may be deactivated. In this case, the device interface 210bb may communicate with the device interface 210ab of the first storage device 200a using various interface protocols.

When the first storage device 200a and the second storage device 200b are independently operated, the device interface 210bb may be deactivated.

The memory interface 210bc may communicate with the second memory device 220b using various interface protocols.

The CPU 210bd may perform various types of operations so as to control the second memory device 220b. The CPU 210bd may generate a second address mapping table and a second candidate address table. In an embodiment, the second address mapping table and the second candidate address table may be generated during the initialization of the second memory device 220b.

When the second storage device 200b is coupled to the first storage device 200a and functions as a slave device of the first storage device 200a, the CPU 210bd may provide information about the storage capacity of the second memory device 220b to the first storage device 200a. The CPU 210bd may receive information about virtual addresses from the first storage device 200a, and may generate a second address mapping table including the virtual addresses.

During a program operation, the CPU 210bd may receive a virtual address from the first storage device 200a, and may select a target address corresponding to the received virtual address from the second candidate address table. The CPU 210bd may map the selected target address to the virtual address. The CPU 210bd may transmit a program command and the target address to the second memory device 220b.

The buffer memory 210be may temporarily store data while the second memory controller 210b controls the second memory device 220b. The buffer memory 210be may be used as a storage which stores various types of information required for the operation of the second memory controller 210b. The buffer memory 210be may store a plurality of tables. For example, the buffer memory 210be may store at least one of the second address mapping table and the second candidate address table.

Figure 12:
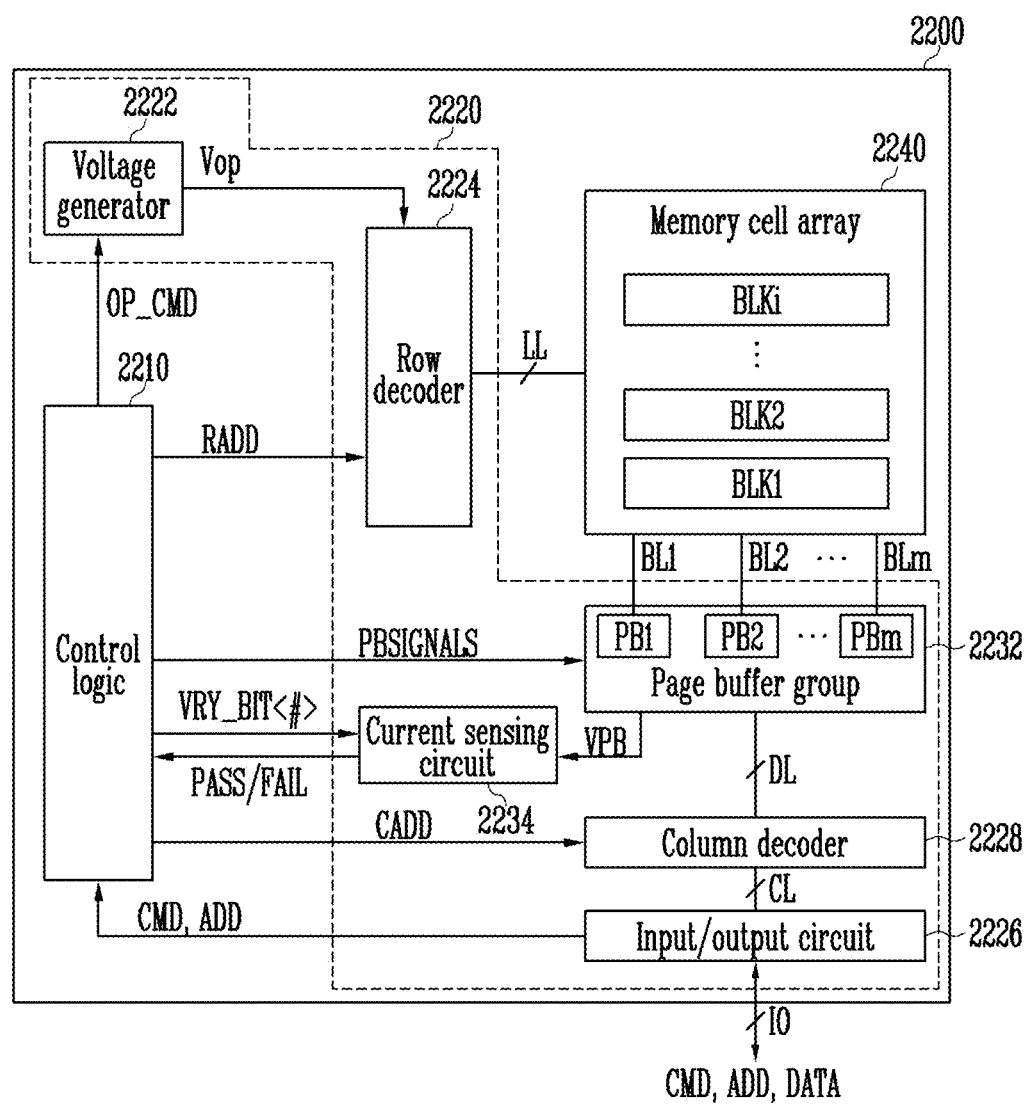
FIG. 12 is a diagram illustrating a memory device according to an embodiment of the disclosed technology.

FIG. 12 is a diagram illustrating a memory device according to an embodiment of the disclosed technology.

A memory device 2200 illustrated in FIG. 12 may be the first memory device 220a or the second memory device 220b illustrated in FIGS. 4 and 11.

The memory device 2200 may include a control logic 2210, peripheral circuits 2220, and a memory cell array 2240. The peripheral circuits 2220 may include a voltage generator 2222, a row decoder 2224, an input/output circuit 2226, a column decoder 2228, a page buffer group 2232, and a current sensing circuit 2234.

The control logic 2210 may control the peripheral circuits 2220 under the control of the memory controllers 210a and 210b illustrated in FIGS. 4 and 11.

The control logic 2210 may control the peripheral circuits 2220 in response to a command CMD and an address ADD that are received from the memory controller 210a or 210b through the input/output circuit 2226. For example, the control logic 2210 may output an operation signal OP_CMD, a row address RADD, a column address CADD, page buffer control signals PBSIGNALS, and an enable bit VRY_BIT<#> in response to the command CMD and the address ADD. The control logic 2210 may determine whether a verify operation has passed or failed in response to a pass or fail signal PASS or FAIL received from the current sensing circuit 2234.

The peripheral circuits 2220 may perform a program operation of storing data in the memory cell array 2240, a read operation of outputting data stored in the memory cell array 2240, and an erase operation of erasing data stored in the memory cell array 2240.

The voltage generation circuit 2222 may generate various operating voltages Vop that are used for the program, read, and erase operations in response to the operation signal OP_CMD received from the control logic 2210. For example, the voltage generation circuit 2222 may transfer a program voltage, a verify voltage, a pass voltage, a read voltage, an erase voltage, a turn-on voltage, etc. to the row decoder 2224.

The row decoder 2224 may transfer the operating voltages Vop to local lines LL that are coupled to a memory block selected from among memory blocks included in the memory cell array 2240 in response to the row address RADD received from the control logic 2210. The local lines LL may include local word lines, local drain select lines, and local source select lines. In addition, the local lines LL may include various lines, such as source lines, coupled to memory blocks.

The input/output circuit 2226 may transfer the command CMD and the address ADD, received from the memory controller through input/output (IO) lines, to the control logic 2210, or may exchange data with the column decoder 2228.

The column decoder 2228 may transfer data between the input/output circuit 2226 and the page buffer group 2232 in response to a column address CADD received from the control logic 2210. For example, the column decoder 2228 may exchange data with page buffers PB1 to PBm through data lines DL or may exchange data with the input/output circuit 2226 through column lines CL.

The page buffer group 2232 may be coupled to bit lines BL1 to BLm coupled in common to the memory blocks BLK1 to BLKi. The page buffer group 2232 may include a plurality of page buffers PB1 to PBm coupled to the bit lines BL1 to BLm, respectively. For example, one page buffer may be coupled to each bit line. The page buffers PB1 to PBm may be operated in response to the page buffer control signals PBSIGNALS received from the control logic 2210. For example, during a program operation, the page buffers PB1 to PBm may temporarily store program data received from the memory controller, and may control voltages to be applied to the bit lines BL1 to BLm based on the program data. Also, during a read operation, the page buffers PB1 to PBm may temporarily store data received through the bit lines BL1 to BLm or may sense voltages or currents of the bit lines BL1 to BLm.

During a read operation or a verify operation, the current sensing circuit 2234 may generate a reference current in response to the enable bit VRY_BIT<#> received from the control logic 2210, and may compare a reference voltage, generated by the reference current, with a sensing voltage VPB, received from the page buffer group 2232, and then output a pass signal PASS or a fail signal FAIL.

The memory cell array 2240 may include a plurality of memory blocks BLK1 to BLKi in which data is stored. In the memory blocks BLK1 to BLKi, user data and various types of information required for the operation of the memory device 2200 may be stored. The memory blocks BLK1 to BLKi may each be implemented as a two-dimensional (2D) structure or a three-dimensional (3D) structure, and may be equally configured.

Figure 13:
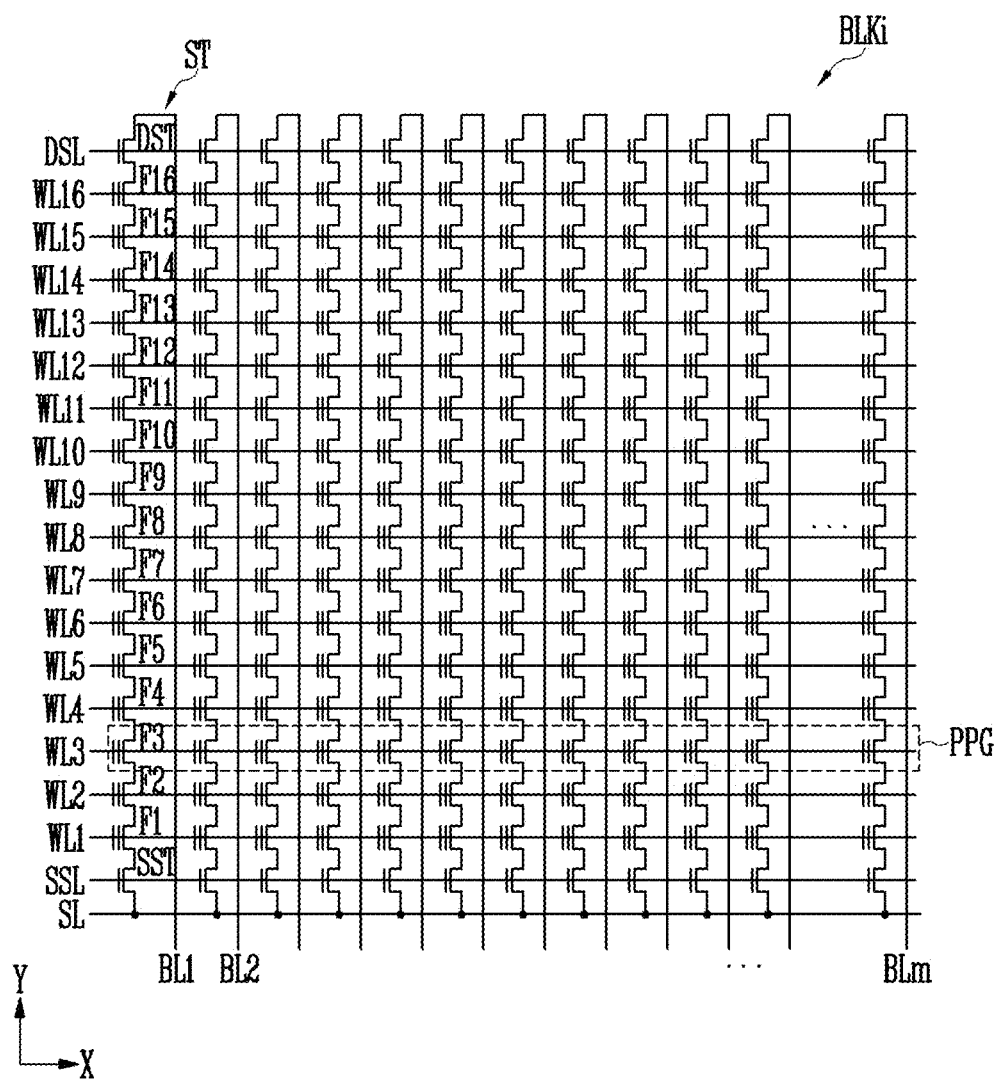
FIG. 13 is an example diagram illustrating a memory block.

FIG. 13 is an example diagram illustrating a memory block.

A memory cell array may include a plurality of memory blocks, and any one memory block BLKi of the plurality of memory blocks is illustrated in FIG. 13 for convenience of description.

A plurality of word lines arranged in parallel to each other between a first select line and a second select line may be coupled to the memory block BLKi. Here, the first select line may be a source select line SSL, and the second select line may be a drain select line DSL. In detail, the memory block BLKi may include a plurality of strings ST coupled between bit lines BL1 to BLm and a source line SL. The bit lines BL1 to BLm may be coupled to the strings ST, respectively, and the source line SL may be coupled in common to the strings ST. The strings ST may be equally configured, and thus the string ST coupled to the first bit line BL1 will be described in detail by way of example.

The string ST may include a source select transistor SST, a plurality of memory cells F1 to F16, and a drain select transistor DST which are coupled in series to each other between the source line SL and the first bit line BL1. A single string ST may include at least one source select transistor SST and at least one drain select transistor DST, and more memory cells than the memory cells F1 to F16 illustrated in the drawing may be included in the string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors SST included in different strings ST may be coupled to the source select line SSL, gates of the drain select transistors DST included in different strings ST may be coupled to the drain select line DSL, and gates of the memory cells F1 to F16 may be coupled to a plurality of word lines WL1 to WL16, respectively. A group of memory cells coupled to the same word line, among the memory cells included in different strings ST, may be referred to as a "physical page: PPG". Therefore, the memory block BLKi may include a number of physical pages PPG identical to the number of word lines WL1 to WL16.

When the memory block BLKi is a single-level cell (SLC) block which operates in an SLC mode, each of physical pages included in the memory block BLKi may store data corresponding to one logical page. The data corresponding to one logical page may include a number of data bits identical to the number of memory cells included in one physical page.

When the memory block BLKi is an m-bit multi-level cell (MLC) block which operates in an m-bit MLC mode, each of physical pages included in the memory block BLKi may store data corresponding to m logical pages.

In accordance with some implementations of the disclosed technology, it is possible to determine, based on an operation mode of a memory system including a first memory device and a second memory device, a storage capacity of the memory system to be equal to either a storage capacity of the first memory device or a sum of storage capacities of the first and second memory devices. Thus, the memory system may provide a performance matching to the usage purpose of the memory system.

The above description provides features and examples of the disclosed technology for a memory system with two or more memory devices. Various implementations of the disclosed technology or modifications may be made based on what is described and illustrated.

What is claimed is:

1. A memory system, comprising:
a first storage device including i) a first memory device including first memory blocks for storing data and ii) a first memory controller coupled to control the first memory device, the first memory controller configured to receive, in connection with operating the first memory device, a request from a host external to the first storage device, the request including a logical address; and
a second storage device coupled to the first storage device and including a second memory device including second memory blocks for storing data and a second memory controller coupled to receive a request from the first storage device, the second memory controller to control the second memory device in response to the received request from the first storage device,
wherein the first memory controller is configured to select a target address among candidate addresses and map the logical address to the target address, and
wherein the candidate addresses include i) first physical addresses corresponding to the first memory blocks and ii) virtual addresses corresponding to the second memory blocks, wherein inclusion of the virtual addresses, in the candidate addresses, enables the first memory controller to use the virtual addresses to fulfill the request.

2. The memory system according to claim 1, wherein the first memory controller is configured to:
set an operation mode of the memory system to any one of a first operation mode and a second operation mode, in response to user request from the host,
determine, based on the operation mode, a storage capacity of the memory system as either i) a storage capacity of the first memory device or ii) a sum of the storage capacity of the first memory device and a storage capacity of the second memory device.

3. The memory system according to claim 2, wherein a number of the logical addresses, included in an address mapping table, is determined based on the storage capacity of the memory system.

4. The memory system according to claim 1, wherein, in response to selecting the target address from the first physical addresses, the first memory controller is configured to transmit a program command and the target address to the first memory device.

5. The memory system according to claim 1, wherein, in response to selecting the target address from the virtual addresses, the first memory controller is configured to transmit a program request and the target address to the second memory controller.

6. The memory system according to claim 5, wherein the second memory controller is configured to map the target address received from the first memory controller to any one of physical addresses corresponding to the second memory blocks.

7. The memory system according to claim 6, wherein the second memory controller is configured to transmit a program command and the any one of the physical addresses to the second memory device.

8. The memory system according to claim 1, wherein the first memory controller is configured to select the target address based on a ratio of free blocks to the first memory blocks.

9. The memory system according to claim 8, wherein the first memory controller is configured to:
when the ratio of the free blocks to the first memory blocks is equal to or greater than a first threshold value, select the target address from among the first physical addresses,
and when the ratio of the free blocks to the first memory blocks is less than the first threshold value, select the target address among the virtual addresses.

10. The memory system according to claim 1, wherein the memory controller is configured to select the target address based on a ratio of valid data stored in the first memory blocks.

11. The memory system according to claim 10, wherein the first memory controller is configured to:
when the ratio of the valid data is less than a second threshold value, select the target address from among the first physical addresses, and
when the ratio of the valid data is equal to or greater than the second threshold value, select the target address among the virtual addresses.

12. A method of operating a memory system, comprising:
generating an address mapping table that includes a number of logical addresses based on a storage capacity of first memory blocks included in a first memory device;
generating a candidate address table that includes candidate addresses that are capable of being mapped to the logical addresses, the candidate addresses including first physical addresses corresponding to the first memory blocks;
generating a number of virtual addresses based on a storage capacity of second memory blocks included in a second memory device separate from the first memory device;
extending the candidate address table by adding the generated virtual addresses to the candidate address table as additional candidate addresses;
selecting a target address, to map to a request for data storage from a host, among the candidate addresses and the additional candidate addresses that are included in the extended candidate address table;
and in response to the request from the host, setting an operation mode of the memory system to i) a first operation mode that operates on the first memory blocks of the first memory device without involving the second memory device or ii) a second operation mode that operates on both the first memory blocks of the first memory device and the second memory blocks of the second memory device.

13. The method according to claim 12, further comprising, when the memory system is in the first operation mode:
mapping a logical address, received from the host, to the target address that is one of the candidate addresses.

14. The method according to claim 12, further comprising, when the memory system is in the second operation mode:
extending the address mapping table by adding a second number of logical addresses, based on the storage capacity of the second memory blocks, to the address mapping table;
and mapping a logical address, received from the host, to the target address that is one of the candidate addresses and the additional candidate addresses.

15. The method according to claim 12, wherein selecting the target address further comprises selecting the target address based on a ratio of free blocks to the first memory blocks.

16. The method according to claim 15, wherein, when the ratio of the free blocks to the first memory blocks is equal to or greater than a first threshold value, the target address is selected from among the first physical addresses.

17. The method according to claim 15, wherein, when the ratio of the free blocks to the first memory blocks is less than the first threshold value, the target address is selected from among the virtual addresses.

18. The method according to claim 12, where selecting the target address further comprise selecting the target address based on a ratio of valid data stored in the first memory blocks.

19. The method according to claim 18, wherein, when the ratio of the valid data is less than a second threshold value, the target address is selected among the first physical addresses.

20. The method according to claim 18, wherein, when the ratio of the valid data is equal to or greater than the second threshold value, the target address is selected among the virtual addresses.

* * * * *